United States Patent
Brault et al.

(10) Patent No.: US 10,815,892 B2
(45) Date of Patent: Oct. 27, 2020

(54) TURBOJET ENGINE WITH THRUST TAKE-UP MEANS ON THE INTER-COMPRESSOR CASE

(71) Applicant: SAFRAN AIRCRAFT ENGINES, Paris (FR)

(72) Inventors: Michel Gilbert Roland Brault, Moissy-Cramayel (FR); Nils Edouard Romain Bordoni, Moissy-Cramayel (FR); Romain Guillaume Cuvillier, Moissy-Cramayel (FR); Guillaume Patrice Kubiak, Moissy-Cramayel (FR); Arnaud Nicolas Negri, Moissy-Cramayel (FR); Nathalie Nowakowski, Moissy-Cramayel (FR)

(73) Assignee: SAFRAN AIRCRAFT ENGINES, Paris (FR)

( * ) Notice: Subject to any disclaimer, the term of this patent is extended or adjusted under 35 U.S.C. 154(b) by 189 days.

(21) Appl. No.: 16/063,909

(22) PCT Filed: Dec. 12, 2016

(86) PCT No.: PCT/FR2016/053345
§ 371 (c)(1),
(2) Date: Jun. 19, 2018

(87) PCT Pub. No.: WO2017/109330
PCT Pub. Date: Jun. 29, 2017

(65) Prior Publication Data
US 2019/0003395 A1 Jan. 3, 2019

(30) Foreign Application Priority Data
Dec. 24, 2015 (FR) ..................................... 15 63323

(51) Int. Cl.
*F02C 7/20* (2006.01)
*F01D 25/16* (2006.01)
(Continued)

(52) U.S. Cl.
CPC .............. *F02C 7/20* (2013.01); *F01D 25/162* (2013.01); *F01D 25/24* (2013.01); *F01D 25/246* (2013.01);
(Continued)

(58) Field of Classification Search
CPC . F02C 7/20; F01D 25/24; F01D 25/28; F01D 25/246; F01D 25/162; F02K 3/06;
(Continued)

(56) References Cited

U.S. PATENT DOCUMENTS

| 3,861,139 A * | 1/1975 | Jones ...................... F02C 3/067 |
| | | 60/226.1 |
| 7,412,819 B2 * | 8/2008 | Bart ....................... F01D 25/162 |
| | | 415/144 |

(Continued)

FOREIGN PATENT DOCUMENTS

| CA | 2929947 A1 | 5/2015 |
| DE | 202013001983 U1 | 5/2013 |

(Continued)

OTHER PUBLICATIONS

English Translation of the Written Opinion of the International Searching Authority dated Feb. 23, 2017, issued in corresponding International Application No. PCT/EP2017/050672 filed Jan. 13, 2017, 4 pages.

(Continued)

*Primary Examiner* — Eldon T Brockman
(74) *Attorney, Agent, or Firm* — Christensen O'Connor Johnson Kindness PLLC (57) ABSTRACT

A multiflow turbojet engine generally includes an upstream fan driven by a gas generator having first and second coaxial compressors, an intake case forming a mounting for the rotors of the upstream fan and the first compressor, an inter-compressor case downstream from the intake case and (Continued)

forming a mounting for the rotors of the second compressor, and attachment means for thrust take-up control rods arranged in the inter-compressor case. The turbojet engine also includes a structural force shroud connecting the intake case to the inter-compressor case, of the and a floating first compressor case.

12 Claims, 5 Drawing Sheets

(51) Int. Cl.
    *F01D 25/24*    (2006.01)
    *F01D 25/28*    (2006.01)
    *F02K 3/06*     (2006.01)

(52) U.S. Cl.
    CPC ............ *F01D 25/28* (2013.01); *F02K 3/06* (2013.01); *F05D 2230/642* (2013.01); *F05D 2240/90* (2013.01); *F05D 2250/41* (2013.01); *Y02T 50/671* (2013.01)

(58) Field of Classification Search
    CPC ............ Y02T 50/671; F05D 2250/41; F05D 2240/90; F05D 2230/642
    See application file for complete search history.

(56) References Cited

U.S. PATENT DOCUMENTS

| 2005/0198941 A1* | 9/2005 | Bart .................. F01D 25/162 60/226.1 |
|---|---|---|
| 2008/0098717 A1 | 5/2008 | Orlando et al. |
| 2012/0195753 A1 | 8/2012 | Davis et al. |
| 2016/0298548 A1 | 10/2016 | Brault et al. |

FOREIGN PATENT DOCUMENTS

| EP | 2592235 A2 | 5/2013 |
|---|---|---|
| EP | 2868592 A1 | 5/2015 |

OTHER PUBLICATIONS

International Search Report dated Mar. 14, 2017, issued in corresponding International Application No. PCT/FR2016/053345, filed Dec. 12, 2016, 3 pages.

Written Opinion of the International Searching Authority dated Mar. 14, 2017, issued in corresponding International Application No. PCT/FR2016/053345, filed Dec. 12, 2016, 6 pages.

* cited by examiner

TURBOJET ENGINE WITH THRUST TAKE-UP MEANS ON THE INTER-COMPRESSOR CASE

FIELD OF THE INVENTION

The invention relates to the field of propulsion in aeronautics. It relates to the suspension of a turbojet engine to an aircraft, and more particularly to the arrangement of the transmission means or thrust take-up means provided by the engine to the structure of the aircraft.

PRIOR ART

The prior art includes documents US-A1-2012/195753, EP-A2-2 592 235, US-A1-2008/098717 and CA-A1-2 929 947

A multi-flow turbo engine according to a known architecture of the prior art includes, from upstream to downstream in the direction of the air flow through the turbojet engine, a ducted fan and a gas generator by means of which it is rotationally driven. The latter is formed by at least a compressor, an annular combustion chamber, at least a turbine and a combustion gas exhaust pipe. The air compressed by the ducted fan is divided into two concentric flows: a primary central flow that supplies the gas generator, and a secondary flow circulating around the generator. Both flows can be discharged into the atmosphere separately by concentric exhaust pipes, or be mixed together downstream from the gas generator and discharged into the atmosphere through a shared exhaust nozzle.

The gas generator is a multi-body gas turbine engine, featuring two bodies for example, with two coaxial and independent rotors. A first low pressure body includes a compressor and a turbine, connected by a first shaft, and a second high pressure body includes a compressor and a turbine, connected by a second shaft that is coaxial to the first. The combustion chamber is supplied in compressed air successively by the ducted fan, the low pressure (LP) compressor and the high pressure (HP) compressor. The combustion gases are expanded successively in the HP high pressure turbine, and then in the LP low pressure turbine, before being evacuated into the atmosphere by the downstream exhaust pipe. The turbines driven by the combustion gases rotationally drive the respective compressors and the ducted fan, the shaft of which is connected to the LP low pressure turbine. The ducted fan can be driven directly by the shaft of the LP body, but according to engine evolutions, it is driven by means of a reducing gear when high bypass rates are required, i.e. an elevated ratio of the secondary flow to the primary air flow. In traditional turbojet engines, where the turbine is directly connected to the ducted fan, bypass rates are limited, namely, by the peripheral speed of the forward blades of the ducted fan. Architectures that feature a ducted fan driven by means of a reducing gear with an ultra-high bypass ratio (UHBR) are able to partially solve this problem by optimising the efficiency of the turbine at moderate ducted fan speeds.

In addition to the rotors, the engine features stator members for support, flow guiding and stress transmission purposes.

In double-flow turbojet engines, a large part of the thrust is provided by the secondary flow. The traction force exerted by the ambient air on the engine partially applies to the blades of the ducted fan, and partially to the walls of the pipe. The path of the stresses from the ducted fan is as follows: axial stresses applied to the blades of the ducted fan are transmitted by a thrust bearing to the fixed parts of the engine, and then to the engine suspensions, particularly the two thrust take-up rods. These rods are usually located in the zone between flow paths, and the attachment covers of the rods are angularly positioned at an angle of approximately 45° relative to the vertical plane. This provides the means to take up the axial thrust stress generated by the ducted fan. The other stresses: torque take-up or stresses on the transversal axes follow different paths that are not included in this patent application.

In this architecture, axial stresses go through the intermediate or inter-compressor case before being transmitted to the suspension.

On an engine with a reduction gear between the turbine shaft and the ducted fan shaft, with ultra-high bypass ratios mentioned above, the path of the stresses is arranged differently.

In this type of architecture, the engine includes, in addition to the inter-compressor case, an inlet case located between the ducted fan and the BP compressor, so as to support the weight of the reduction gear and the bearings. The inlet case is therefore designed to directly support the reduction gear that features, for example, epicyclic gearing. The consequence of the presence of an inlet case is that the ducted fan and the LP shaft are no longer carried by the inter-compressor case, but by the inlet case. Therefore, the inlet case also takes up the axial stresses of the ducted fan shaft, through the bearing that supports the ducted fan shaft, as well as the axial stresses of the LP shaft, through the bearing of the LP shaft. It should be noted that both bearings are selected so as to form axial dampers and absorb the axial loads. Ball bearings are used for this purpose, but other types of bearings are suitable too. For example, the rotor of the ducted fan can be supported by double tapered roller bearings that can replace the currently used roller bearing and ball bearing.

The thrust take-up rods are preferably secured to the inter-compressor case, as their assembly onto the inlet case would not be advantageous. In the latter case, the space in the zone between the flow paths would have to be extended to allow their inclusion. The length of the rods would have to be increased, which would have an impact on their weight. Furthermore, the stiffness of the rods would have to be increased to prevent vibrational stresses. Finally, their inclusion in the inlet case area would conflict with the installation of accessories, such as the oil tank, drain valve and the synchronising ring which controls variable-pitch stator vanes of the compressor.

In this architecture, the axial stresses go through the inlet case and travel to the inter-compressor case through the LP compressor located between the two cases. This is not without consequence: the LP compressor case features low mechanical strength and the axial stress that corresponds to the thrust take-up on the case could cause deformations, the consequence of which would be, on one hand, increased clearance of the front blades, causing a loss of efficiency, or on the other hand, reduced clearance of the front blades, creating the risk of stator/rotor contact.

The low mechanical strength of the LP compressor can be compensated by increasing its thickness, using the same material, which would result in increased weight. However, as long as stresses are transmitted through it, deformations can be observed with the above consequences.

The purpose of this invention is to remedy this disadvantage.

PRESENTATION OF THE INVENTION

This objective can be achieved with a multi-flow turbojet that includes:

a. an upstream ducted fan driven by a gas generator, b. the gas generator comprising a first and a second coaxial compressor, c. an inlet case forming a support for the rotors of the ducted fan and the first compressor, d. an inter-compressor case located downstream from the inlet case, and forming a support of the rotor of the second compressor, e. attachment means for the thrust take-up rods arranged on the inter-compressor case.

According to the invention, the turbojet is characterised by the fact that it includes a stress structural shroud connecting the inlet case to the inter-compressor case, the compressor including a floating case.

The solution according to the invention resides in separating the structural function of the case of the first compressor from that of the outer wall of the primary air flow path. The structural shroud transmits the stresses between both cases. As a floating case, the case of the first compressor that forms the wall of a air flow path does not transmit any stress. In particular, the case forming a wall of a flow path is connected in a floating configuration to one of the two inlet and inter-compressor cases by means of a backlash connection.

Therefore, with this device, the necessity of reinforcing the compressor case is removed on one the hand, and the stress on the case that can cause deformations affecting the efficiency of the compressor is eliminated on the other hand.

Furthermore, the device takes up all the stresses that are transmitted between the cases. These include:

axial stresses that correspond to the thrust take-up, shear stresses caused by the weight of the engine or the inertial stresses of the HP body suspended at its ends, the torsion torque on the engine axis, the bending torque resulting from the weight or the inertial stress of the HP body suspended at its ends.

The take-up of stresses other than axial stresses improve the mechanical situation of the engine, by limiting the deformation of the HP body, for example.

In one embodiment, the stress structural shroud is located on and welded to the inlet case. Downstream, it is bolted onto the inter-compressor case.

In another embodiment version, the stress structural shroud is located on and bolted to both the inlet case and the inter-compressor case.

When the inlet case comprises a variable stator vane (VSV) shroud that supports the variable-pitch stator vanes, said VSV shroud features longitudinal reinforcement ribs.

According to another characteristic, the floating case of the compressor is connected to one of the two inlet and inter-compressor cases by means of an axial backlash floating connection. Preferably, it features a radial backlash. Preferably, the connection comprises a first flange that covers, with a backlash, a second flange.

To prevent air leaks, the floating connection includes a gasket that insulates the primary flow path from the ambient air.

Preferably, and as described in patent application FR A 3 007 458, the inter-compressor case includes two radial flanges arranged transversally with respect to the axis, where both flanges are connected by ribs oriented along the axis. More particularly, the inter-compressor case includes arms that intersect with a primary flow path, whereby said ribs are located in the extension of said arms. Advantageously, the attachment means of the thrust take-up rods are secured to one of the two flanges.

Finally, the solution allows transmission of all types of stresses, while limiting the space used by the device and providing sufficient space for the accessories located above the LP compressor.

The invention in particular relates to a turbojet engine featuring a ducted fan that is driven by a LP turbine and that includes a reduction gear between a shaft of the LP turbine and the ducted fan. The reduction gear, for example, features epicyclic gearing. The inlet case is arranged so as to form a support for the reduction gear. At least a part of bearings supporting the shaft of the ducted fan and the LP shaft, respectively, in the inlet case, are configured to form axial bearings.

BRIEF DESCRIPTION OF THE FIGURES

The invention is better understood, and other purposes, details, characteristics and advantages of this invention will become clearer upon reading the following detailed explanatory description relating to the embodiments of the invention, provided solely as examples without limitation, with reference to the appended schematic drawings.

On these drawings.

DETAILED DESCRIPTION OF EMBODIMENTS OF THE INVENTION

Figure 1:
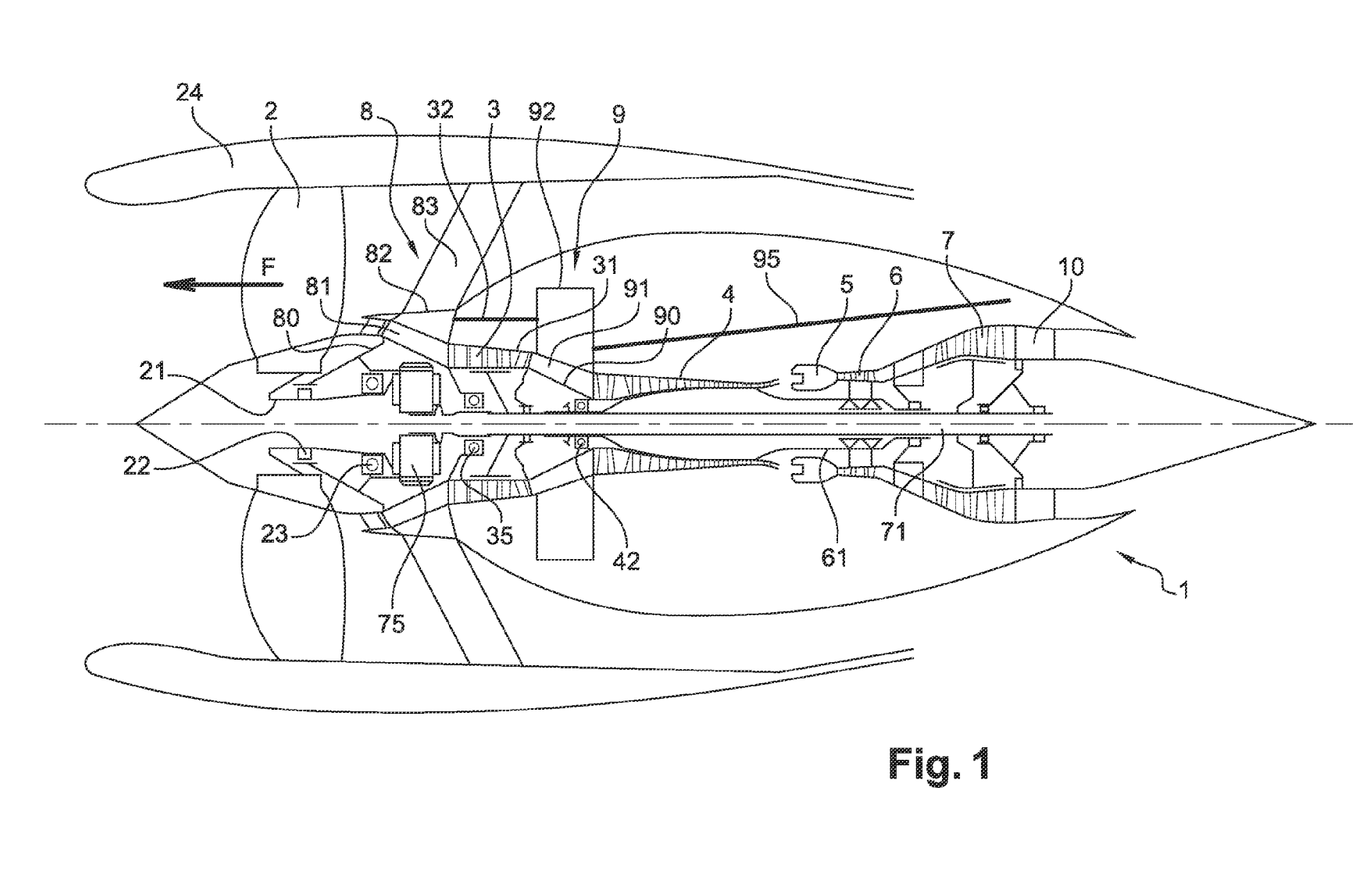
FIG. 1 shows a schematic and axial cross-section view of an example of an engine architecture according to the invention.

FIG. 1 shows a turbojet engine 1 with, from upstream to downstream, a ducted fan 2 and a double-body gas generator formed by a first compressor 3, a second compressor 4, a combustion chamber 5 and two successive turbines 6 and 7. The first compressor forms with the turbine 7, to which it is connected by a turbine shaft 71, the low pressure LP body. The second compressor 4 forms with the turbine 6, to which it is connected by a turbine shaft 61, the high pressure HP body. The fixed structural members that transmit the stresses from the engine to the suspension include: the inlet case 8 located at the inlet of the gas generator between the ducted fan 2 and the LP compressor 3, the inter-compressor case 9 between the LP compressor 3 and the HP compressor 4, as well as the exhaust case 10, located downstream.

The shaft 21 of the ducted fan is mounted rotationally in two bearings 22 and 23, the first of which is for example a roller bearing, and the second 23 in the vicinity of the case, is a ball bearing for example, and forms an axial thrust bearing. The shaft 21 is connected to the shaft 71 of the LP turbine 7 by means of a reduction gear 75 with epicyclic gearing. This shaft 71 is secured to the rotor of the LP compressor 3, which is rotationally mounted in the inlet case 8 by means of a ball bearing, for example. The three bearings 22, 23 and 35 and the reduction gear 75 are mounted in, and supported by the hub 80 of the inlet case 8. Therefore, the inlet case also takes up the axial stresses of the ducted fan shaft, through the ball bearing 23 of the ducted fan shaft, as well as the axial stresses of the LP shaft, through the ball bearing 35 of the LP shaft From the hub 80 of the inlet case 8, extends a plurality of radial arms 81 that intersect with the primary flow path and are interconnected by an annular part 82 inserted between the primary flow path and the secondary flow path. From this inserted annular part 82 extends a plurality of radial arms 83 that intersect with the secondary flow path and connect the inserted part 82 to the case 24 of the ducted fan. Attachment means to the structure of the aircraft can be included in the extension of the arms 83 on the case of the ducted fan.

Figure 2:
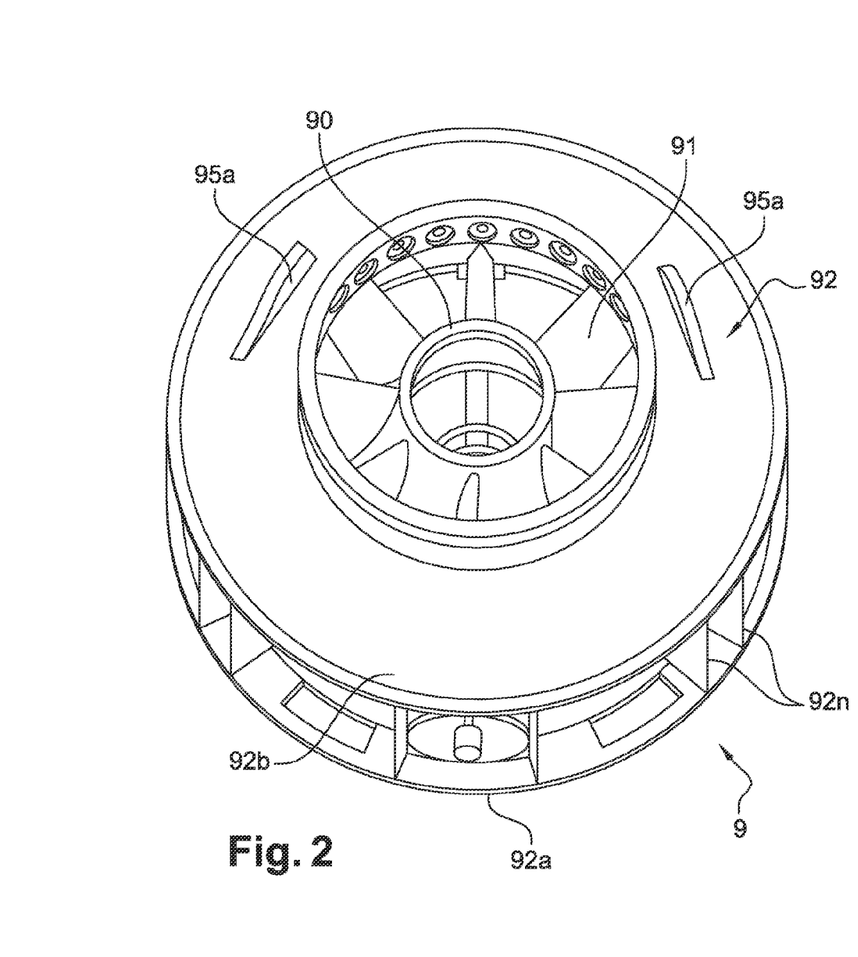
FIGS. 2 and 3 show a perspective view of an inter-compressor case, seen from downstream and the side.
Figure 3:
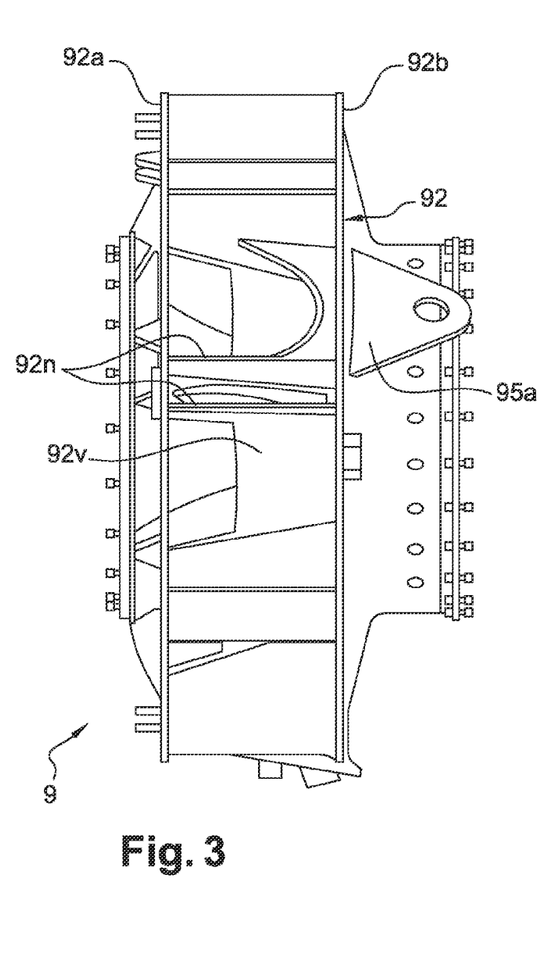

The inter-compressor case 9 is located immediately downstream from the LP compressor 3, and upstream from the HP compressor 4. It includes a hub 90, which is intersected by the LP shaft 71. This hub forms a support for the bearing 42, in which the end trunnion of the HP compressor 4 comes to rest. From the hub 90 extends a plurality of radial arms 91 that intersect with the primary flow path. The arms 91 are interconnected by an annular part 92. This annular part 92 of the inter-compressor case is the seat of the attachments 95a for the thrust take-up rods 95, arranged to transmit the axial thrust stress to the suspension of the engine. An example of inter-compressor case is described in the patent application FR A 3 007 458 filed by this applicant. The case is shown in FIGS. 2 and 3. It should be noted that the annular part 92 of the case 9 is primarily formed by a shroud 92v that defines the radially-outer wall of the primary flow path at that level, and from which extend two transversal radial flanges with respect to the engine axis, one upstream 92a and the other downstream 92b. Axial ribs 92n arranged about the axis connect the two walls 92a and 92b. Preferably, the ribs are arranged in the extension of the radial arms 91.

The axial stress, shown by arrow F, on the blades of the ducted fan resulting from the rotation of the ducted fan are transmitted to the shaft 21 of the ducted fan, and then from the shaft to the hub 80 through the ball bearing 23 that forms an axial thrust bearing. The stress path travels through the inlet case 8, by means of the inserted part 82, and through the case 31 of the LP compressor 3, the annular part 92 of the inter-compressor case 9 and the thrust take-up rods 95 that are secured thereto.

Figures 4, 5:
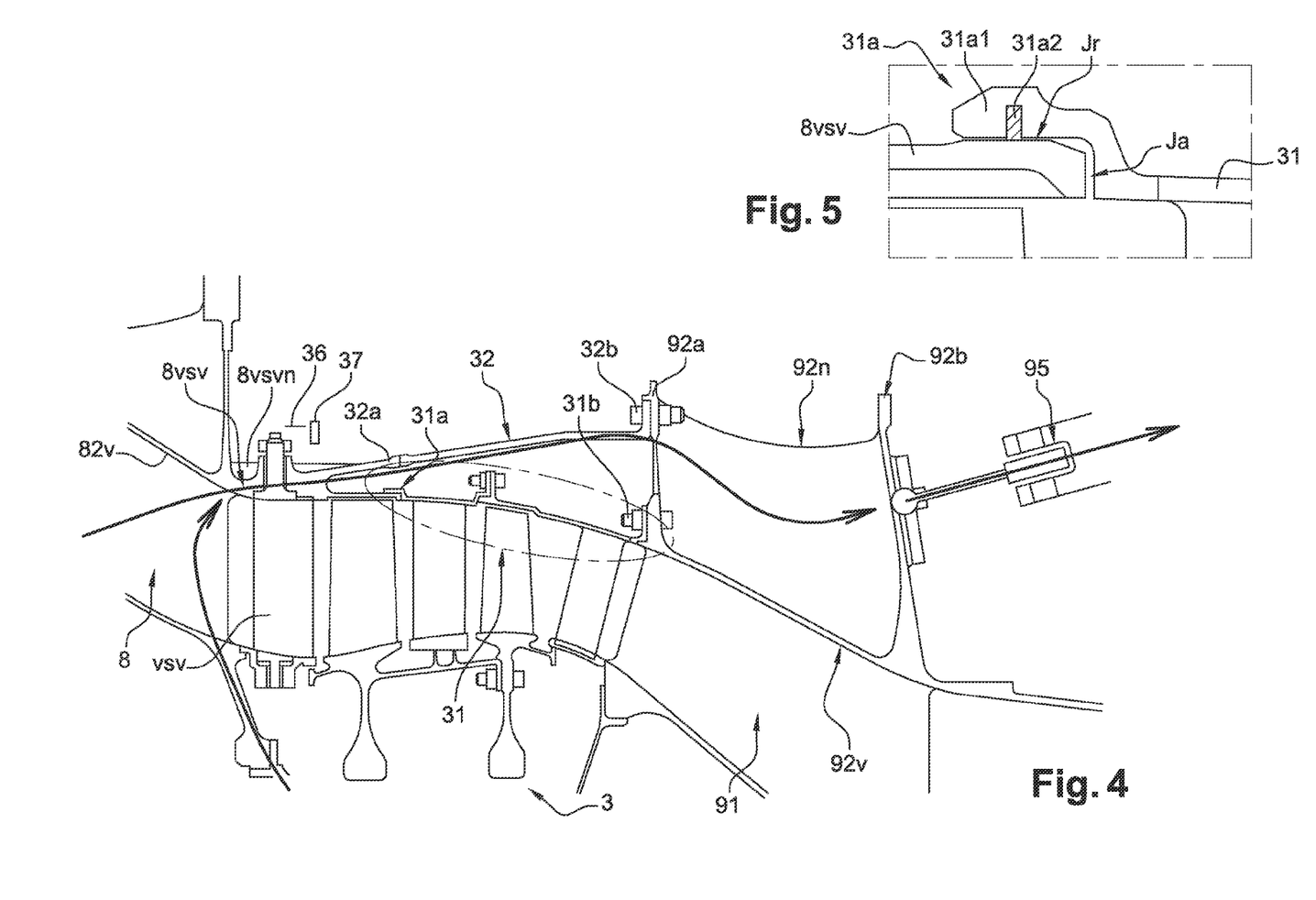
FIG. 4 is a partial view of the engine, with a cross-section view that shows one embodiment of the invention featuring a stress structural shroud.
FIG. 5 shows the detail of a floating case connection to the inlet case.

According to the invention, a stress structural shroud 32 connects the inserted part 82 and the annular part 92 of both cases 8 and 9. The stress structural shroud 32 can also be located on the inlet case 8. FIG. 4 provides a cross section view of the LP compressor between the inlet case 8 and the inter-compressor case 9.

The inlet case features a shroud 8vsv in the axial extension of the shroud 82v. The variable-pitch stator vanes VSV are pivotally mounted in this shroud 8vsv and connected to a synchronising ring 37 by means of adapted control levers 36. The structural shroud 32 is welded in 32a along the downstream edge of the shroud 8vsv. Downstream, the shroud 32 is bolted in 32b to the upstream flange 92a of the inter-compressor case. The upstream flange 92a and the ribs 92n take up the horizontal component of the thrust of the ducted fan, and the shroud 92v and the downstream flange 92 form a single-block rigid unit.

The shroud 32 forms a rigid connection between the two cases 8 and 9. Therefore, the axial stresses exerted on the thrust bearings 23 and 35 are transmitted through the inlet case 8 to the inter-compressor case 9 and to the thrust take-up rods 95.

The case 31 of the compressor forms the shell inside which the mobile blades of the LP compressor 3 rotate; for this purpose, it includes the radial stator vane wheels, that form the rectifiers, guiding the air flow between the compressor stages, as well as the rings that connect them. In the embodiment illustrated, the case is bolted in 31b, downstream, to the flange 92a of the inter-compressor case. Upstream, it is connected to the shroud 8vsv by means of a floating connection 31a. An example of a floating connection is shown in detail in FIG. 5. The case 31 is extended by a first axial flange 31a1. The first flange is annular and covers the second flange that forms the downstream edge of the shroud 8vsv.

There is an axial clearance Ja between the case 31 and the downstream flange of the shroud 8vsv. There is also a radial clearance Jr between the axial flange 31a1 and the shroud 8vsv. A gasket 31a2 is arranged between both parts to prevent air leaks from the primary flow path into the ambient air. The gasket 31a2 in this case is in the form of a segment housed in an internal groove of the axial flange 31a1. The 31a connection is a floating connection because of the clearances Ja and Jr.

More specifically, an overlap is made between the inner flange formed by the downstream edge of the shroud 8vsv and an outer flange 31a1 to ensure the sealing of the flow path while providing an axial clearance. The outer flange forms a step that ensures the continuity of the flow path. The slot created by the step is limited in length to reduce losses. However, its length is sufficient to compensate for the gap variations between the inlet case and the inter-compressor case. As the pressure in the low pressure compressor is low compared with the pressure in the other parts of the engine, such as the high pressure compressor on the high pressure turbine, the losses generated through the blind slot are relatively reduced. The temperature deviations between a hot engine and a cold engine in this area are relatively low compared with the hot parts of the engine, such as the high pressure compressor or the high pressure turbine, which also limits the required size of the axial clearance, namely a few millimetres in this case.

The radial clearance is determined so as to, on one the hand, be efficiently compensated by the gasket and limit the volume of the slot cavity, and on the other hand, to compensate for the misalignment between the inlet case and the inter-compressor case. The radial clearance is approximately one millimetre. The gasket compensates for the radial clearance Jr in order to prevent air leakage from the primary air flow path towards the exterior of the compressor, and in particular towards the compartment surrounding the compressor that is not configured to receive said air flow. Such leakage would also reduce compressor efficiency.

As these clearances are still present when the engine is running, no stress is transmitted through this connection. Since the case 31 is not subject to any interfering stress, it will not undergo deformations that generate compressor efficiency losses.

Figure 6:
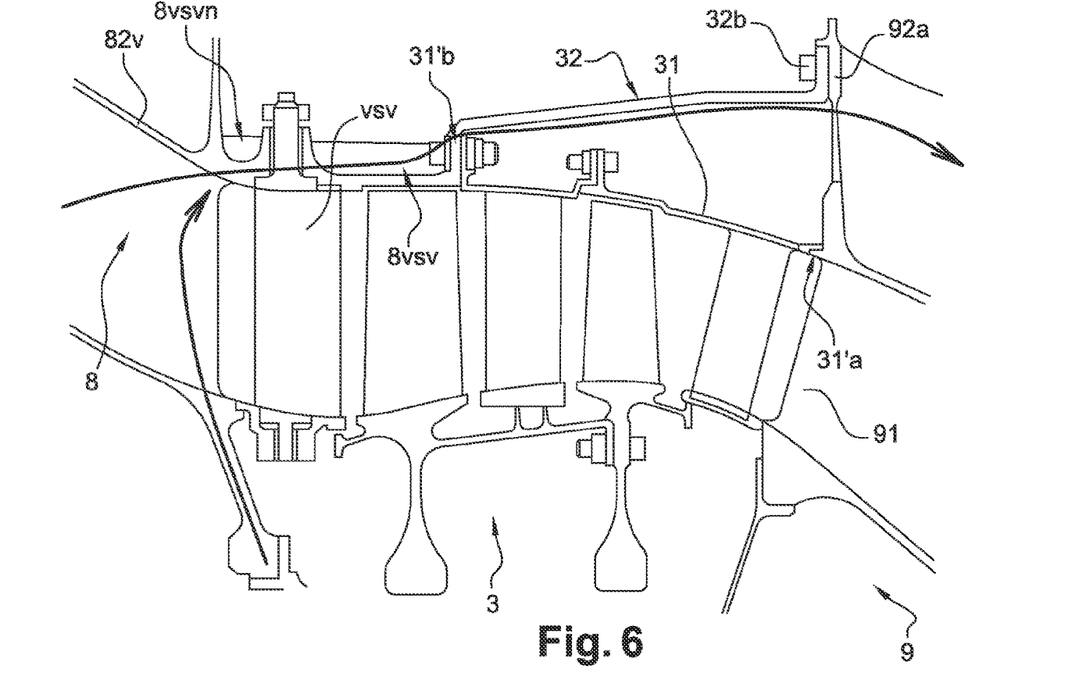
FIG. 6 shows a different embodiment of the invention from that of FIG. 4.

FIG. 6 shows another embodiment of the floating case. The floating connection 31'a, in this version, is located on the downstream edge of the case 31. The arrangement of FIG. 5 is shown mutatis mutandis. The axial flange of the case 31 (idem) surrounds an axial flange that corresponds to the inter-compressor case 9, while providing an axial clearance and a radial clearance. An adapted gasket prevents leakage through these clearances. The upstream connection 31'b is bolted.

Figure 7:
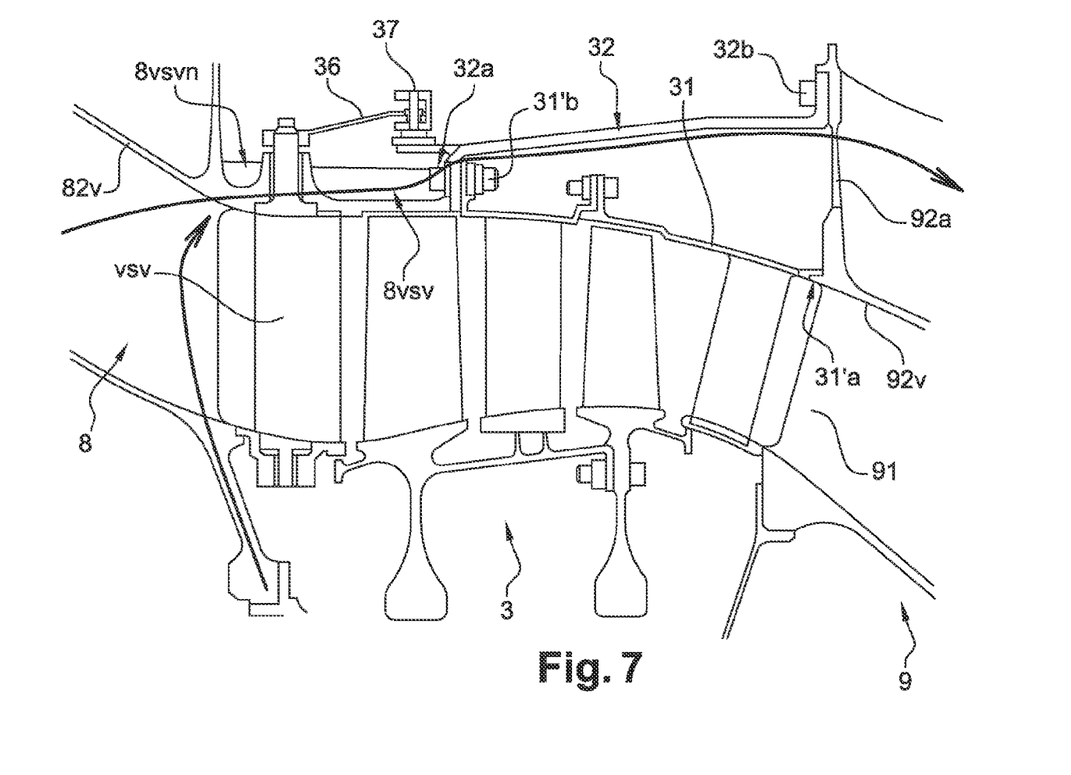
FIG. 7 shows another embodiment version of the invention featuring a bolted structural shroud.

FIG. 7 shows another version. It relates to the structural shroud 32. The upstream connection between the structural shroud and the shroud 8*vsv* is bolted in 32*a*, instead of being welded. The assembly of the case 31 of the LP compressor 3 remains floating, with a bolted connection on one side, upstream in this case, and floating on the other side, downstream in this case.

Figure 8:
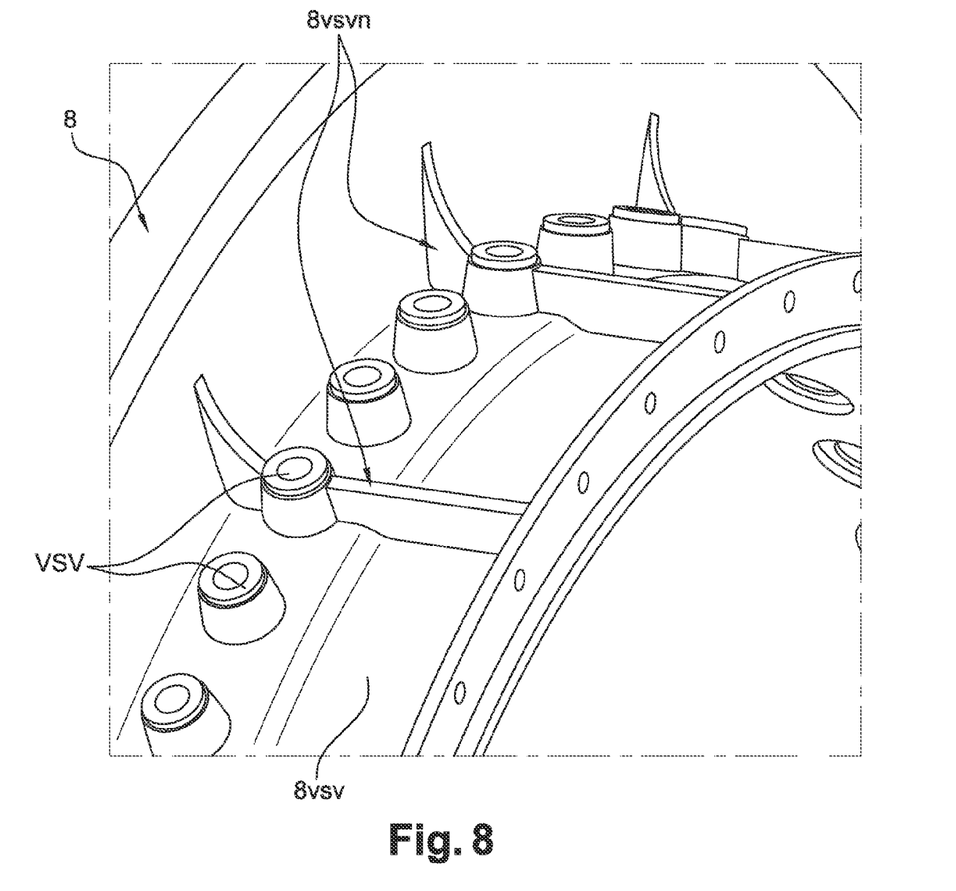
FIG. 8 shows a perspective and detailed view of the shroud of vanes VSV, reinforced with longitudinal ribs.

FIG. 8 shows a detailed view of the shroud 8*vsv* and the VSV vanes. The VSV vanes are not shown; only the housings of the pivots are shown. For the purpose of reinforcing this shroud 8*vsv*, longitudinal ribs 8*vsv* are arranged on the outer surface of the shroud, parallel to the axis. These ribs contribute to the transmission of axial stress between the inlet case 8 and the stress structural shroud 32.

The invention relates to other embodiments (not shown) that serve the same purpose.

The invention claimed is:

1. A turbojet engine including:
   an upstream ducted fan driven by a gas generator, whereby the gas generator comprises a first compressor and a second compressor that is coaxial with the first compressor;
   an inlet case configured to form a support for a plurality of rotors of the upstream ducted fan and the first compressor;
   an inter-compressor case located downstream from the inlet case, and configured to form a support for a plurality of rotors of the second compressor;
   attachment means for a plurality of thrust take-up rods arranged on the inter-compressor case; and
   a stress structural shroud configured to connect the inlet case to the inter-compressor case,
   wherein the first compressor comprises a floating case that forms a wall of a flow path.

2. The turbojet engine according to claim 1, wherein the floating case that forms the wall of the flow path is connected in a floating configuration to one of the inlet case and the inter-compressor case by a backlash connection.

3. The turbojet engine according to claim 1, wherein the stress structural shroud is welded to the inlet case and bolted to the inter-compressor case.

4. The turbojet engine according to claim 1, wherein the stress structural shroud is bolted on the inlet case and bolted on the inter-compressor case.

5. The turbojet engine according to claim 1, wherein the inlet case comprises a shroud that supports a plurality of variable-pitch stator vanes, wherein the shroud features a plurality of longitudinal reinforcement ribs.

6. The turbojet engine according to claim 1, wherein the floating case of the first compressor is connected to one of the inlet case and the inter-compressor case by an axial backlash floating connection.

7. The turbojet engine according to claim 6, wherein the axial backlash floating connection comprises a radial backlash.

8. The turbojet engine according to claim 6, wherein the axial backlash floating connection comprises a first flange that covers, with clearance, a second flange.

9. The turbojet engine according to claim 6, wherein the axial backlash floating connection comprises a gasket configured to insulate the flow path from ambient air.

10. The turbojet engine according to claim 1, wherein the inter-compressor case comprises a plurality of radial flanges arranged transversally with respect to an engine axis, and wherein the attachment means of the plurality of thrust take-up rods are secured to one of the plurality of radial flanges.

11. The turbojet engine according to claim 1, wherein the upstream ducted fan is driven by a low pressure turbine that comprises a reduction gear between a shaft of the low pressure turbine and a shaft of the upstream ducted fan.

12. The turbojet engine according claim 11, wherein at least a part of a plurality of bearings supporting the shaft of the upstream ducted fan and the shaft of the low pressure turbine, in the inlet case, is configured to form an axial bearing.

* * * * *

UNITED STATES PATENT AND TRADEMARK OFFICE
CERTIFICATE OF CORRECTION

PATENT NO. : 10,815,892 B2
APPLICATION NO. : 16/063909
DATED : October 27, 2020
INVENTOR(S) : Brault et al.

Page 1 of 1

It is certified that error appears in the above-identified patent and that said Letters Patent is hereby corrected as shown below:

On the Title Page

Page 2, item (57), Line 5, Please delete "of the" before "and"

Signed and Sealed this
Twentieth Day of July, 2021

Drew Hirshfeld
*Performing the Functions and Duties of the*
*Under Secretary of Commerce for Intellectual Property and*
*Director of the United States Patent and Trademark Office*